(12) United States Patent
Lavagno et al.

(10) Patent No.: US 7,702,499 B1
(45) Date of Patent: Apr. 20, 2010

(54) SYSTEMS AND METHODS FOR PERFORMING SOFTWARE PERFORMANCE ESTIMATIONS

(75) Inventors: Luciano Lavagno, Berkeley, CA (US); Mihai Lazarescu, Turin (IT); Alberto Sangiovanni-Vincentelli, Berkeley, CA (US); Marcello Lajolo, Torino (IT)

(73) Assignee: Cadence Design Systems, Inc., San Jose, CA (US)

( * ) Notice: Subject to any disclaimer, the term of this patent is extended or adjusted under 35 U.S.C. 154(b) by 1679 days.

(21) Appl. No.: 09/847,642

(22) Filed: May 1, 2001

Related U.S. Application Data

(60) Provisional application No. 60/201,540, filed on May 2, 2000.

(51) Int. Cl.
 *G06F 9/455* (2006.01)
(52) U.S. Cl. ........................................ 703/27
(58) Field of Classification Search ............... 703/27
 See application file for complete search history.

(56) References Cited

U.S. PATENT DOCUMENTS

| | | | | | |
|---|---|---|---|---|---|
| 5,857,093 | A | * | 1/1999 | Bradford | 703/21 |
| 6,018,624 | A | * | 1/2000 | Baxter | 703/16 |
| 6,230,114 | B1 | * | 5/2001 | Hellestrand et al. | 703/13 |
| 6,470,482 | B1 | * | 10/2002 | Rostoker et al. | 716/6 |
| 6,598,221 | B1 | * | 7/2003 | Pegatoquet et al. | 717/152 |
| 6,678,644 | B1 | * | 1/2004 | Segal | 703/15 |
| 6,952,825 | B1 | * | 10/2005 | Cockx et al. | 718/102 |
| 6,973,417 | B1 | * | 12/2005 | Maxwell et al. | 703/2 |

OTHER PUBLICATIONS

Lajolo, Marcello; Lazarescu, Mihai; Sangiovanni-Vincentelli, Alberto; "A Compilation-based Software Estimation Scheme for Hardware/Software Co-Simulation", 7th International Workshop on Hardware/Software Co-Design, May 3-5, 1999.*
Mak, Ronald; "Writing Compilers and Interpreters: an applied approach", 1991, John Wiley & Sons.*
Hartoog, Mark R.; Rowson, James A.; Reddy, Prakash D.; Desai, Soumya; Dunlop, Douglas D.; Harcourt, Edwin A.; Khullar, Neeti; "Generation of Software Tools from Processor Descriptions for Hardware/Software Codesign", 34th Design Automation Conference 1997.*
Suzuki, Kei; Sangiovanni-Vincentelli, Alberto; "Efficient Software Performance Estimation Methods for Hardware/Software Codesign", 1996, 33rd Design Automation Conference.*

(Continued)

*Primary Examiner*—Paul L Rodriguez
*Assistant Examiner*—Russ Guill
(74) *Attorney, Agent, or Firm*—Vista IP Law Group LLP

(57) ABSTRACT

Systems and methods are provided for annotating software with performance information. The computer code is compiled into assembler code, the assembler code is translated into a simulation model, expressed in assembler-level source code. The simulation model is annotated with information for calculating various performance parameters of the software, such as timing information, or resource usage information. The simulation model is then re-compiled and executed on a simulator, optionally including a hardware simulation model, and the performance information is computed from the simulation.

52 Claims, 7 Drawing Sheets

OTHER PUBLICATIONS

Claudio Passerone et al.; "Fast hardware/software co-simulation for virtual prototyping and trade-off analysis", 1997, Proceedings of Design Automation Conference 1997, pages labelled 1-6.*

Jwahar R. Bammi et al.; "Software Performance Estimation Strategies in a System-Level Design Tool", May 3, 2000, CODES 2000, pp. 82-86.*

Prof. Dov Dori, *About OPCAT*, 2000, pp. 1-2, http://iew3.technion.ac.il~dori/opcat/about.htm1.

Prof. Dov Dori, *OPM Methodology*, 2000, pp. 1-3, http://iew3.technion.ac.il/~dori/opcat/methodology.htm1.

Prof. Dov Dori; *OPCAT's Contents*, 2000, pp. 1-5, http://iew3.technion.ac.il~dori/opcat/contents.htm1.

Prof. Dov Dori; *Examples*; 2000, pp. 1-3 http://iew3.technion.ac.il/~dori/opcat/example.htm1 (Fig. 1 and Fig. 2 did not display when website was viewed).

Vojin Zavojnovic, Stefan Pees, Christian Schlaeger, Markus Willems, Rainer Schoenen and Heinrich Meyr; *DSP Processor/Complier Co-Design A quantitative Approach*, ICSPAT, 1997, pp. 761-765.

Guido Post, Vojin Zivonjovic and Sebastian Ritz; *Multiprocessor, Architecture Extension for the BlockDiagram-Oriented Design Tool Cossap/Descartes*, ICSPAT, 1995.

Stefan Pees, Vojin Zivojnovic, Andreas Hoffmann, Heinrich Meyr; *Retargetable Timed Instruction Set Simulation of Pipelined Processor Architectures* , ICSPAT, 1998.

Marcello Lajolo, Mihai Lazarescu, Alberto Sangiovanni-Vincentelli, *A Compliation-based Software Estimation Scheme for Hardware/Software Co-Simulation*, CODES, 1999.

Mihai T. Lazarescu, Jwahar R. Bammi, Edwin Harcourt, Luciano Lavagno, Marcello Lajolo, *Compliation-based Software Performance Estimation for System Level Design*, HLDVT, Nov. 8, 2000, pp. 1-6.

Graham R. Hellestrand, *Designing System on a Chip Products Using Systems Engineering Tools*, 1999, pp. 1-6, VaST Systems Technology Corporation.

Vojin Zivojnovic, Stefan Pees, Heinrich Meyr, *LISA—Machine Description Language and Generic Machine Model for HW/SW Co-Design*, Oct. 1996, 1996 IEEE Workshop on VLSI Signal Processing, San Francisco.

Vojin Zivojnovic, Steven Tjian, Heinrich Meyr, *Complied Simulation of Programmable DSP Architectures*, 1995, pp. 187-196, In the Proceedings of the 1995 IEEE Workshop on VLSI Signal Processing.

Vojin Zivojnovic, Juan Martinez Velarde, Christian Schlager, Heinrich Meyr, *Integrated Systems for Signal Processing*, E.E. Times, Oct. 17, 1994, Issue: 819 pp. 1-5, http://content.techweb.com/se/directlink.cgi?EET19941017S0055 .

Vojin Zivojnovic, Stefan Pees, Christian Schlager, Heinrich Mery, *Signal Processing Design, LISA bridges gaps in high-tech languages*, E.E. Times, Oct. 7, 1996, Issue: 922, pp. 1-6, http://content.techweb.com/se/directlink.cgi?EET199961007S0136.

V. Zivojnovic, S. Pees, *Complied DSPs check out fast*, E.E. Times, Oct. 23, 1995, Issue: 871, Section: Digital Signal Processing, pp. 1-5, http://content.techweb.com/se/directlink.cgi?EET19951023S0056.

Vojin Zivojnovic, Heinrich Meyr, *Complied HW/SW Co-Simulation*, 1996, Integrated Systems for Signal Processing, Aachen University of Technology, Aachen, Germany.

Dr. Graham Hellestrand, *The Advent of the Virtual Processor Model*, E. E. Times, May 14, 1999, pp. 1-7, VaST Systems Technology, Santa Clara, CA, USA.

Graham R. Hellestrand, *Systems Engineering: The Era to the Virtual Processor Model (VPM)*, Apr. 14, 1999, pp. 1-6, VaST Systems Technology, Santa Clara, CA, USA.

Stephan Ohr, *Neolinear Tips Analog Synthesis*, E. E. Times, Jun. 12, 2001, pp. 1-3, Com, http://www.eetimes.com/story/OEG20010612S0067.

Soner Önder, Rajiv Gupta, *Automatic Generation of Microarchitecture Simulators*, May 1998, IEEE International Conference on Computer Languages.

Joachim Fitzner, ChrisSchläger, Davorin Mista, Vojin Zivojnovic, *Implementing LISA Tools Based on a DSP Architecture Description*, ICSPAT 1999.

Lisa Guerra, Joachim Fitzner, Dipankar Talukdar, Chris Schlager, Bassam Tabbara, Vojin Zivojnovic, *Cycle and Phase Accurate DSP Modeling and Integration for HW/SW Co-Verfication* DAC 1999.

Stafan Pees, Andreas Hoffmann, Vojin Zivojnovic, Heinrich Meyr, *LISA—Machine Descrpition Language for Cycle-Accurate Models of Programmable DSP Architectures*, DAC 1999.

Chris Schlager, Joachim Fitzner, Vojin Zivojnovic, *Using Supersim Complied Processor Models for Hardware, Software and System Design*, ICSPAT 1998.

Vojin Zivojnovic, Chris Schlager, Joachim Fitzner, *System-Level Modeling of DSP and Embedded Processors*, ASILOMAR 1998.

* cited by examiner

SYSTEMS AND METHODS FOR PERFORMING SOFTWARE PERFORMANCE ESTIMATIONS

This application claims the benefit of U.S. Provisional Patent Application No. 60/201,540 filed May 2, 2000 entitled "SYSTEM AND METHOD FOR PERFORMING SOFTWARE PERFORMANCE ESTIMATION" and naming Marcello Lajolo et al. as inventors, which application is incorporated herein by reference, in its entirety.

COPYRIGHT NOTICE

A portion of the disclosure of this patent document contains material that is subject to copyright protection. The copyright owners have no objection to the facsimile reproduction, by anyone, of the patent document or the patent disclosure, as it appears in the Patent and Trademark Office patent file or records, but otherwise reserve all copyright rights whatsoever.

FIELD OF THE INVENTION

The invention relates to computer systems, and more particularly to methods for estimating performance of software code.

BACKGROUND

With the ability to mix processors, complex peripherals, and custom hardware and software on a single chip, full-system design and analysis demand a new methodology and set of tools. Today, high performance integrated circuit ("IC") technologies combine ever-increasing computing power with complex integrated peripherals and large amounts of memory at decreasing costs. It comes as no surprise that the software content of these embedded systems grows exponentially. While the system development tool industry has overlooked this trend for years, most estimates place the software development cost at well over half the total development budget for a typical system. The bias to software in system-level design arises mostly from the migration from application-specific logic to application-specific code, driven mainly by the need to cut down product costs and time to market.

Short product life cycles and customization to niche markets force designers to reuse not only building blocks, but entire architectures as well. The architecture cost is often paramount, thus the prime goal is to achieve the right combination of processor, memory and glue logic for efficient manufacturing. Once this prime goal is achieved, the architecture is analyzed for appropriateness and efficiency to different applications or behaviors. The fitness of a new architecture to a variety of end-user applications determines its market size. Reused architectures (platforms) often constitute the basis for a cluster of products that may differ in details such as software features, regulatory standards, or language specialization. Every time new features are added to a reused architecture, the architecture performance needs to be re-analyzed to ensure it provides the right timing and support. Using efficient system development tools can significantly streamline this performance analysis procedure.

An important part of the design consists in fitting together the behavior (from the specifications) and the architectural blocks (from IP suppliers) in such way that the cost, power consumption, and timing of the system can be analyzed. For the hardware side, ASIC (Application-Specific Integrated Circuit) companies provide gate-level models and timing shells. For the software blocks, a similar characterization method is expected from system development tools.

When properly separated, the behavior and the architecture may co-evolve. As new requirements in the behavior call for changes in the architecture, architecture considerations (e.g., production cost) may lead to behavior modifications. Good system design practice keeps the specification as abstract as possible and allows independent mapping of behavior onto architecture. This is the essence of what has been termed function/architecture co-design.

Once mapped, the behavior can be annotated with estimated execution delays. The delays depend on the implementation type (hardware or software) and on the performance and inter-action of the architectural elements (e.g., IC technology, access to shared resources, etc. for hardware; clock rate, bus width, real-time scheduling and CPU sharing, etc. for software). These estimates should be accurate enough to help in making high level choices such as: deciding which behavior needs to be implemented in hardware and what can be done by software, how to architect the software in terms of threads, and what real-time operating system ("RTOS") to use.

Embedded systems are a significant application area for system-level design. Embedded systems interact with the outside world. They may read sensors, control actuators, communicate with other systems, or interact with users. Timing accuracy of these tasks is very important. A system with tight timing constraints is a "real-time" system. Design specifications for such systems add time constraints to functional specifications. These constraints specify the minimum and maximum times that a component of the system can consume in completing a task. The design tools are expected to provide accurate timing simulations at early stages of system definition, to assist the designer. High-level performance estimation coupled with a fast co-simulation framework is a suitable solution to forestall performance problems in embedded system design.

Providing good timing information for the hardware/software co-simulator, at an early stage, before designing detailed hardware and software, is a very difficult problem, especially for the software side. Small architectural enhancements can rapidly obsolete a previously good software estimation technique. This goal was pursued through various methods, but none of these is suitable for the function/architecture co-design methodology. They generally target worst-case execution time analysis for a single program. These approaches are not suitable for embedded systems, which are composed of multiple tasks, accessing common resources, whose dynamic activation can significantly modify each others' execution paths.

Thus methods and systems are required to accurately evaluate the performance of a system at different levels of abstraction. The evaluation must be done dynamically, in a simulation environment, to capture run-time task interaction. Moreover, it should be fast enough to enable the exploration of several architectural mappings in search for the best implementation. Tunable models, where the designer can trade accuracy for speed, would do the best.

SUMMARY OF THE INVENTION

In an aspect of an embodiment of the invention, software source code is compiled into assembler code for simulation purposes, using the same compiler used to generate the production software executable.

In another aspect of an embodiment of the invention, binary code is disassembled into assembler code for simulation purposes.

In another aspect of an embodiment of the invention, assembler code is translated into an assembler-level source code simulation model, expressed in a high-level source code language.

In another aspect of an embodiment of the invention, the simulation model is annotated with statically estimated performance information based on the architecture of the hardware the production software executable will run on.

In another aspect of an embodiment of the invention, the simulation model is annotated with formulas for dynamically determining performance information based on the architecture of the hardware the production software executable will run on.

In another aspect of an embodiment of the invention, the simulation model reconstructs all of the functionality of the software source code.

DETAILED DESCRIPTION OF THE PREFERRED EMBODIMENTS

Figure 1:
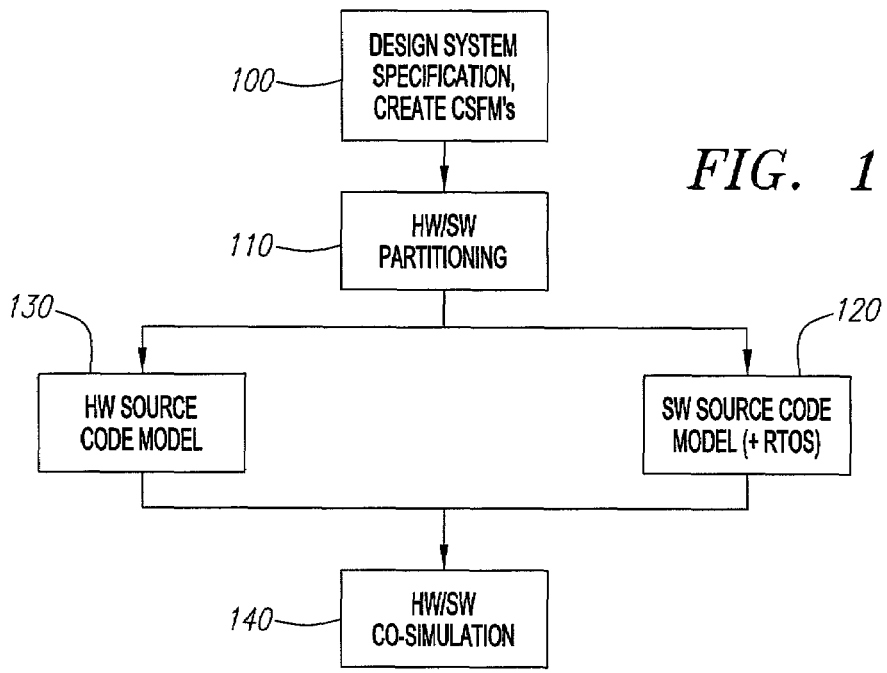
FIG. 1 is a flowchart of a method for generating a hardware/software co-simulation, in accordance with an embodiment of the invention.

In designing a software/hardware system, such as an embedded system, the general process of FIG. 1 is followed. The process of FIG. 1 is shown with reference to the POLIS co-design environment. POLIS is an example of a co-design environment that can be used in accordance with an embodiment of the invention, and is described in F. Balarin, M. Chiodo, P. Giusto, H. Hsieh, A. Jureska, L. Lavagno, C. Passerone, A. Sangiovanni-Vincentelli, E. Sentovich, K. Suzuki, and B. Tabbara, *Hardware-software Co-Design of Embedded Systems: The POLIS Approach*. Kluwer Academic Publishers, Norwell, Mass., 1997, which is hereby incorporated herein by reference, in its entirety.

The process commences at step 100, where a hardware/software description, preferably based upon a design specification, is described. The description may be in the form of a network of communicating logical entities (e.g., Code-sign Finite State Machines (CFSMs)). At step 110, these logical entities are mapped for implementation as either hardware or software. At step 120, a first software program modeling the software-based logical entities (software CFSMs) is synthesized. At step 130 a second software program modeling the hardware-based logical entities (hardware CFSMs) is synthesized. In an embodiment, the software program for the software-based portion of the hardware/software system implementation also includes a model of a real-time operating system. The first and second software programs are then applied to a co-simulator, which simulates the operation of and interactions between the various logical entities, at step 140. From this simulation, performance data such as execution times, power consumption, and component costs are extracted. This data is then used to assist the system designer in creating a system that uses an optimal combination of hardware and software elements.

Figure 2:
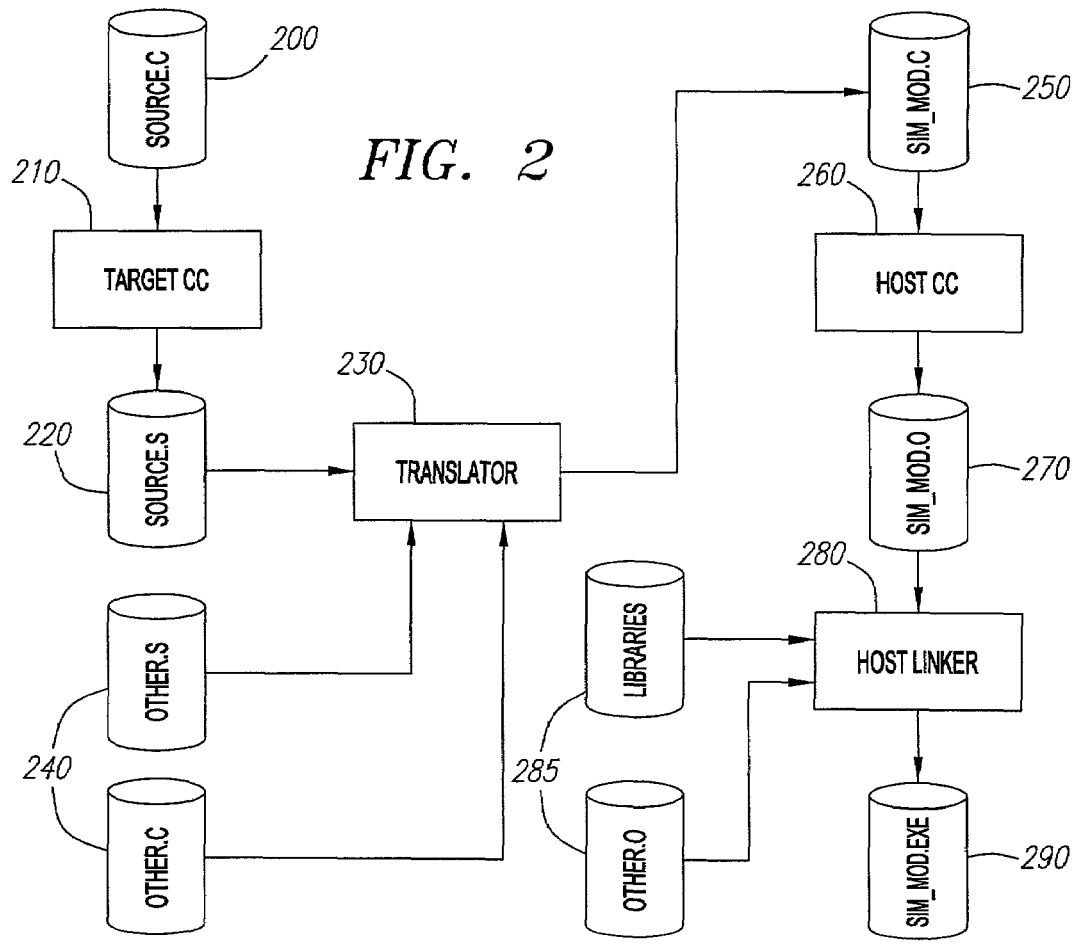
FIG. 2 is a flowchart of a method for generating a software simulation model, in accordance with an embodiment of the invention.

In an embodiment, the software program of step 120 of FIG. 1 is optimized for simulation using the method of FIG. 2. The output of the method of FIG. 2 is then provided to the co-simulator of step 140 of FIG. 1. The method of FIG. 2 starts at step 200 with the software program of step 120 of FIG. 1. The software program is compiled at step 210. In an embodiment, the compiler used in step 210 to compile the software program is the same compiler that will be used to generate the executable code that will run in the target environment, when the final production executable code for the software/hardware system is generated (hereinafter the "production compiler"). The production compiler compiles the software program using the same compiler options as will be used for the production executable. The GCC compiler is an example of a production compiler suitable for use in an embodiment of the invention.

In another embodiment, the production compiler is not available to the system designer. For example, company policy might require the use of a different compiler, or the designer may not have development tools that are compatible with the production compiler, or access to the production compiler might be restricted. In this embodiment, the software program is compiled using another compiler that is available to the system designer. Once a simulation model is generated by the translator, as discussed below, the simulation model is itself a source code representation of the software module. The simulation model preserves the exact functionality of the original software module, and can therefore be re-compiled using the production compiler, when the production executable is generated.

The compiler generates an assembly-language representation of the software program ("assembler") at step 220. This assembler is fed into a translator at step 230. The translator translates the assembler into a simulation model, which comprises an assembler-level representation of the software program, expressed in a high-level programming language such as the C programming language. The translator also optionally gathers information from either the source code or assembler of other modules of the application program, as needed, at step 240.

In an alternate embodiment, binary code is disassembled into assembler, and this assembler is provided to the translator at step 230. In this embodiment, since assembler generated from binary code typically lacks information such as comments and assembler directives, high-level hints about the software program are preferably provided to the translator.

During the translation process, the simulation model is annotated with timing information. This timing information represents an estimation of how long it will take the target architecture to execute the various elements of the program being translated. This timing information takes advantage of the fact that all of the architecture-specific effects (e.g. instruction scheduling, register allocation, addressing modes, memory accesses, etc.) of the target architecture are visible in the assembler representation of the software program. In an embodiment, the simulation model is also annotated with other performance-related information, as selected by the system designer. Exemplary performance-related information includes bus transaction information, or other system resource usage information. The translator outputs the simulation model at step 250.

At step 260, the simulation model is compiled for the simulator host machine architecture. At step 270, the host compiler outputs an object code representation of the simulation model. At step 280, the object code representation of the simulation model is provided to a linker. At step 285 the object code representations of other simulation models of the software application, host and simulator libraries, etc. are provided to the linker, and the simulation model is linked with the other object code, creating a simulation-ready host program. The simulation-ready host program is output at step 290. The method then terminates. At this point, the host program can be combined with the hardware simulation code, and executed on a simulator, which simulates the operation of the hardware/software system, and allows for performance measurements, such as execution times, power consumption, system resource usage, etc., to be taken.

The object code representations linked at step 285 can include assembler-level translated models, models annotated using other methods and functional non-translated models. For example, the simulation-ready host program could include several models that have been translated using the above method, as well as several linked libraries that have been annotated with timing information using other methods. This feature is useful when it is not possible to compile the entire simulation-ready host program using the method of FIG. 2. This feature is also useful where a particular model, for example a frequently used library function, has already been annotated with accurate timing information. Manually designing fast and precise timing models for frequently used library functions is a viable approach. This approach, however, is not efficient for application-specific software code.

The basic assumptions needed to generate an accurate simulation model using this method are: 1) the input to the translator has been optimized by the target compiler. Except for hardware optimizations, made by the target architecture at run time, no other optimization will be made; 2) the optimizations made at run time by the target architecture (e.g. register renaming) are known by the translator; 3) the input for the translator is generated by the same compiler that will be used for the production executable. In an embodiment where one or more of these assumptions is not valid, the method still functions, but simulation model accuracy decreases.

The accuracy of the method relies on the fact that the simulation model has the same behavior as the original software application. As long as the same assembler is used to generate the production executable and the simulation model, then this will hold true. Therefore, the same compiler should be used for both the production executable and the simulation model. As discussed above, this is not always possible. In this situation, generating the production executable from the simulation model output of the translator, rather than the assembler input maximizes the accuracy of the simulation model.

Figure 3:
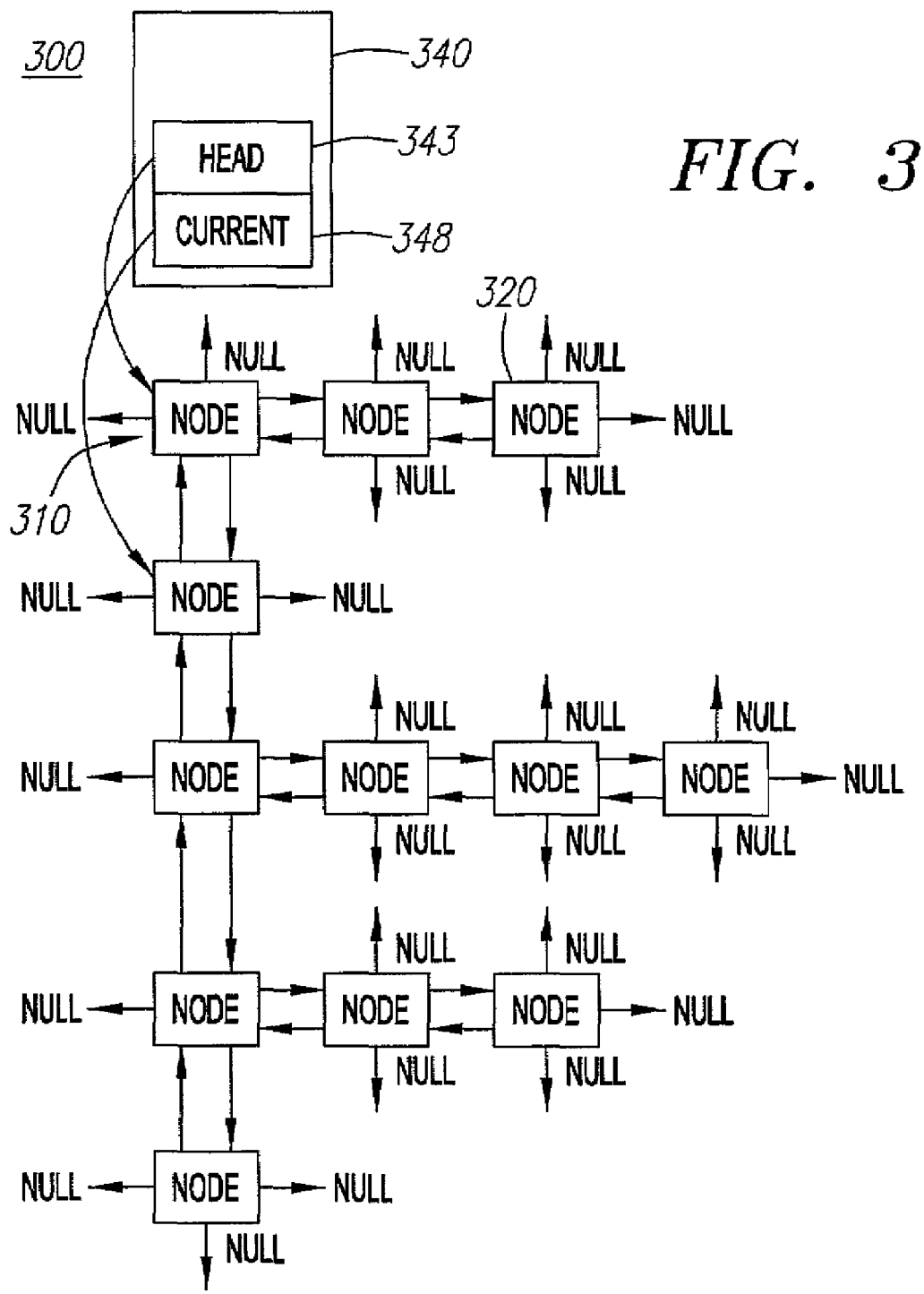
FIG. 3 is a depiction of a main data structure for a translator, in accordance with an embodiment of the invention.

The operation of the translator discussed in step 230 of FIG. 2 will now be discussed in more detail. The translator starts with the assembler output of the target compiler. The assembler is then parsed into a main data structure 300, as shown in FIG. 3. The main data structure is built around the concept of a time slot. This concept is not bounded by a definition to a cycle of the target architecture. It can mean, for different processors, a clock cycle, an operation cycle, a pipeline stage, or any other measurement of time that is convenient for the system designer to use. The time slot is a concept related to the operation of the translator. The system designer can map a time slot to any period of time or operation category that best suits the granularity of the model to be generated. Moreover, the slot mapping/definition can vary from one segment of the main data structure to another, based upon a property associated with the nodes of the main data structure. This way, the performance model designer can dynamically control the level of detail of the behavior of the target architecture that is modeled.

The main data structure 300 comprises horizontal lists 310 of nodes 320, each horizontal list 310 corresponding to a time slot. Each node 320 in the main data structure 300 is linked to other nodes 320. Nodes 320 in the same time slot are linked together in a chain. The lead node 320 in each horizontal list 310 is linked to the lead node 320 of the adjacent horizontal lists 310. The main data structure 300 also contains a header node 340. The header node 340 contains a head pointer 343 and a current pointer 348. The head pointer 343 points to the first node 320 in the main data structure 300. The current pointer points to the node 320 that is currently being operated on. As the translator iterates through the main data structure 300, the current pointer 348 is updated to point at the node 320 currently being worked on.

In an embodiment, each assembler element (e.g. assembler instruction, assembler directive, label, or comment) is represented in the main data structure by one or more nodes. The translator populates the main data structure by iterating through the assembler and creating the necessary nodes, based upon the type of element being parsed, the characteristics of the target architecture, and the granularity of the simulation model selected by the system designer.

Figure 4:
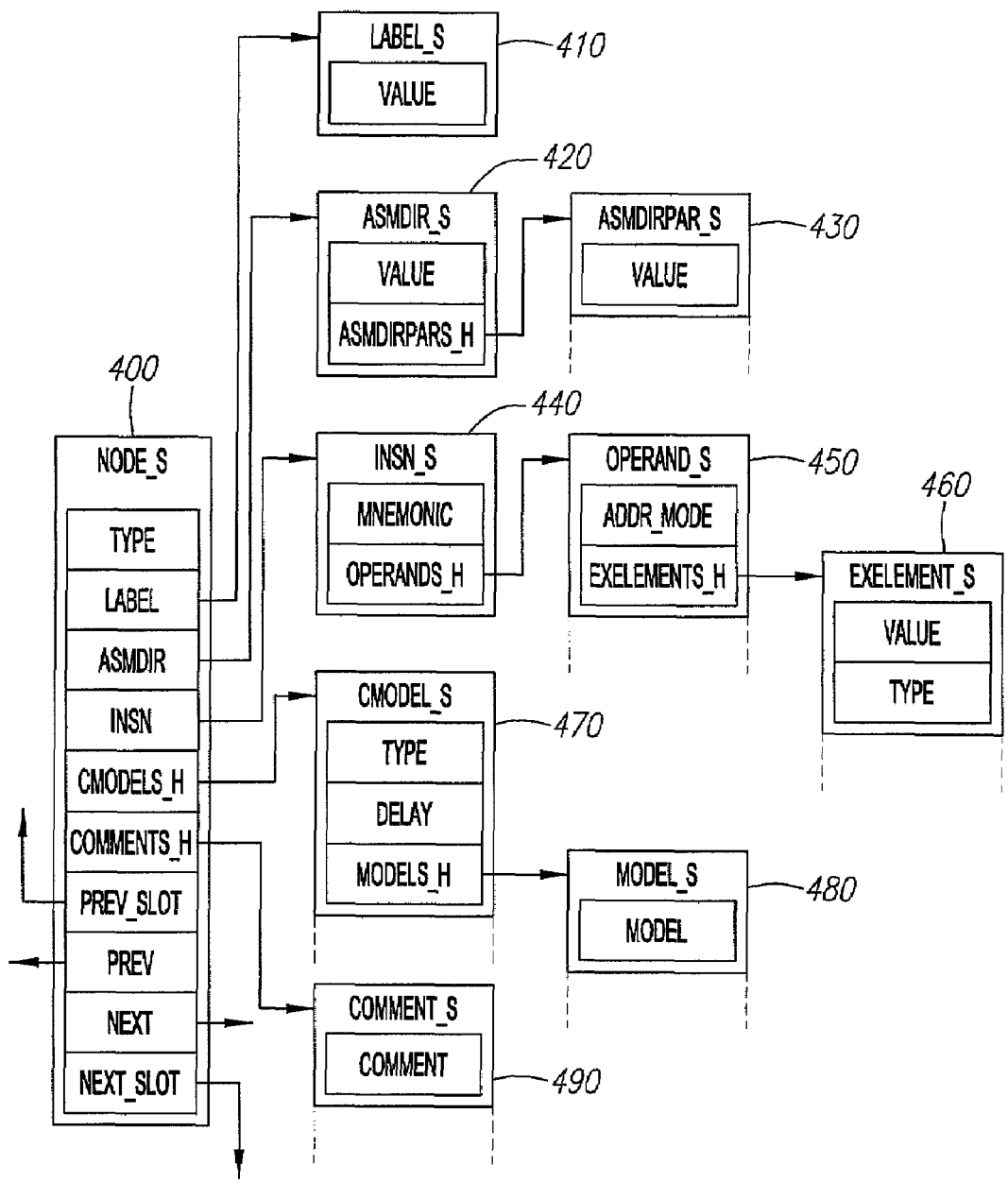
FIG. 4 is a depiction of the layout of a node of the main data structure, in accordance with an embodiment of the invention.

Each node 320 is organized as shown in FIG. 4. The node has a header portion 400. The header portion 400 contains several fields. The fields used in the node can be defined, modified or extended, for example by using parameters passed from an architecture description or an interactive user interface. The precise fields to be used in the node are design choices for those skilled in the art, depending on the assembler elements and types of behaviors the system designer wishes to gather information about.

In the exemplary embodiment of FIG. 4, the header portion 400 contains a type field. The type field serves to classify the general category of the assembler element represented by the node, such as whether the node represents an assembler instruction, an assembler directive, a label, or a comment. This information is useful if the node is viewed as a node of a program graph, or for other high-level processing.

The header portion 400 also contains a label field. If the node contains a label, the label field contains a pointer to a label data structure 410 containing data relevant to translating the label. Otherwise, the label field is NULL. The label data structure 410 contains a value field, which stores the name of the label.

The header portion 400 also contains an assembler directive (asmdir) field. If the node contains an assembler directive, the assembler directive field contains a pointer to an assembler directive data structure 420 containing data relevant to translating the assembler directive. Otherwise, the assembler directive field is NULL. The assembler directive data structure 420 contains a value field, which stores the name of the assembler directive, and a parameter field (asmdirpars_h), which stores a pointer to a parameter list 430. Each entry in the parameter list 430 contains a parameter value field, which stores the value of a parameter of the assembler directive. If the assembler directive stored in the assembler directive data structure 420 has no parameters, the parameter field is NULL.

The header portion 400 also contains an assembler instruction (insn) field. If the node contains an assembler instruction, the assembler instruction field contains a pointer to an instruction data structure 440, containing data relevant to translating the assembler instruction. Otherwise, the assembler instruction field is NULL. The instruction data structure 440 contains a mnemonic field, which contains the mnemonic name of the instruction, and an operands field (operands_h), which contains a pointer to an operands list 450. The operands list 450 contains an entry for each operand of the instruction. The operands list 450 has an addressing mode field (addr_mode), which indicates the addressing mode used by the operand, and a pointer to an operand element list 460. The operand element list 460 contains an entry for each element of the operand. Each operand element entry contains a value field, which stores the value of the element, and a type field, which stores the data type of the element.

The header portion 400 also contains a models (cmodels_h) field. If the node contains an assembler element that will be translated into the simulation model, the models field contains a pointer to a models data structure 470. Otherwise, the models field is NULL. The models data structure 470 contains information that will be used to generate the simulation model when the node is processed by the output functions of the translator. The information comprises a translation of the functionality of the node, expressed in the language that the translator is translating the assembler input into.

The models data structure 470 contains an entry for each composite model for the assembler element. Each entry contains a type field, which indicates the type of the composite model, a delay field, which indicates the time the composite model will take to execute on the target architecture, and a models field (models_h), which contains a pointer to a model list 480.

The delay field stores the execution delay value associated with the composite model. Where the delay can be computed statically, this value is a constant. For example, in some target architectures a load instruction that loads a fixed size value into a register will always take the same amount of time to execute, no matter what the value is. Therefore the delay for the load instruction is computed ahead of time, for the particular target architecture, and that value is provided to the translator as part of the target architecture description. Where the delay is context or data-dependent or otherwise must be computed at run-time, this value is an expression to be output to the simulation model. For example, in some target architectures a floating-point division instruction will take a different amount of time to execute, depending on the values of the divisor and the dividend. Therefore, the delay can only be represented as an expression that requires knowing the divisor and dividend, at run-time.

The model list 480 contains an entry for each model for the assembler element. Each entry contains a model field, which contains the model for expressing the indicated portion of the assembler element in the language used by the simulation model.

The header portion 400 also contains a comment (comments h) field. If the node contains a comment, the comment field contains a pointer to a comments data structure 490 containing data relevant to translating a comment. Otherwise, the comment field is NULL. The comments data structure 490 contains an entry for each comment associated with the node. Each entry contains a comment field, containing the comment text.

The header portion 400 also contains a previous slot (prey slot) field. If the node is the lead node for the time slot, and the node is not in the first time slot in the main data structure, then the previous slot field contains a pointer to the lead node in the previous time slot. Otherwise the previous slot field is NULL.

The header portion 400 also contains a previous node (prey) field. If the node is not the lead node for the time slot, then the previous node field contains a pointer to the previous node in the time slot. Otherwise the previous node field is NULL.

The header portion 400 also contains a next node (next) field. If the node is not the last node for the time slot, then the next node field contains a pointer to the next node in the time slot. Otherwise the next node field is NULL.

The header portion 400 also contains a next slot (next slot) field. If the node is the lead node for the time slot, and the node is not in the last time slot in the main data structure, then the next slot field contains a pointer to the lead node in the next time slot. Otherwise the next slot field is NULL.

The node structure described above can be extended with fields to accommodate other modeling functionality, such as a way to generate bus transaction information in the model (to gather data on how the software will use the bus), or hooks for using the model for co-verification, or other such extensions. Additionally, the amount of information added to the simulation model output can be tuned up or down by varying the parameters passed to the algorithms that process the main data structure.

Figure 5:
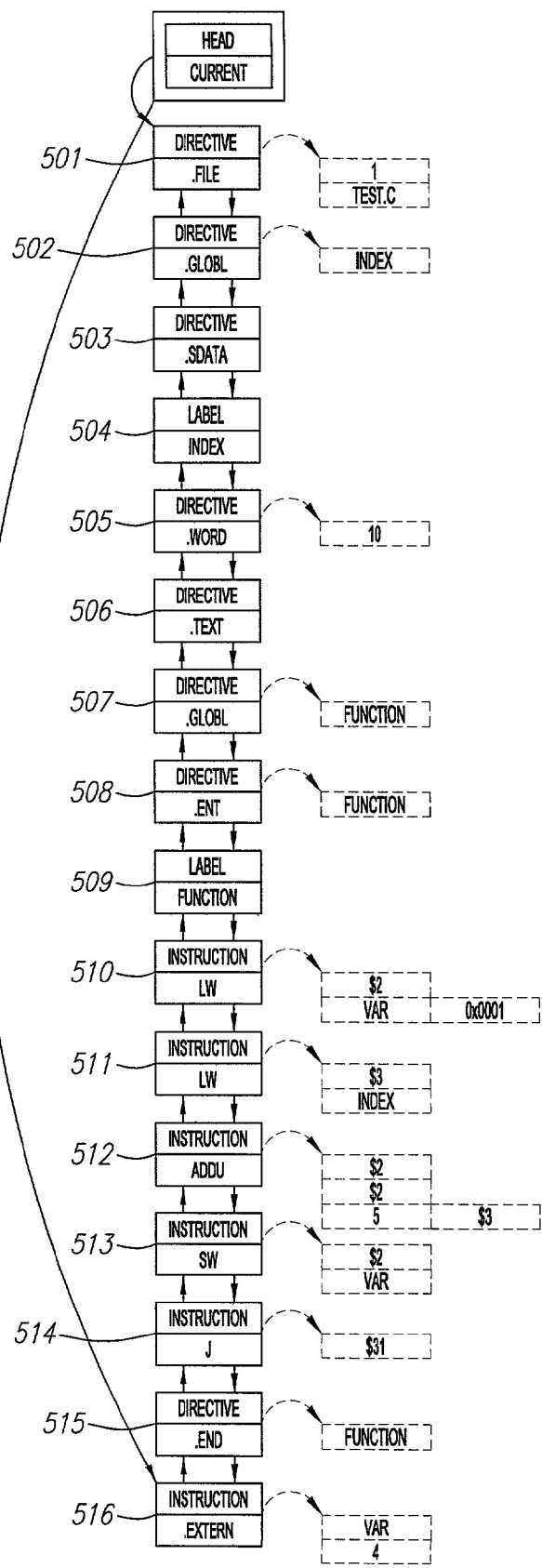
FIG. 5 is a depiction of an exemplary main data structure populated with data, in accordance with an embodiment of the invention.

An exemplary assembler fragment, and the corresponding main data structure for the fragment, is shown in FIG. 5. Initially, each line of assembler is represented as a separate time slot in the main data structure. As the main data structure is processed, however, some of the nodes may be eliminated from the main data structure when they are no longer needed. Similarly, as the main data structure is processed, nodes may be added to the time slots of the structure and time slots may be added or removed from the structure, as required to accurately capture the behavior of the assembler in the simulation model.

The first node 501 contains the assembler directive .file 1 "test.c". This assembler directive has two parameters, "1" and "test.c", associated with it. The assembler directive name is stored in the value field of the assembler directive data structure associated with the first node 501, as discussed above. The two parameters are stored in the parameter list associated with the first node 501, as discussed above.

The second node 502 contains the assembler directive .globl index. The assembler directive name is stored in the value field of assembler directive data structure associated with the second node 502. This assembler directive has one parameter, "index", associated with it, which is stored in the parameter list associated with the second node 502.

The third node 503 contains the assembler directive .sdata, which has no parameters. The assembler directive name is stored in the value field of assembler directive data structure associated with the third node 503.

The fourth node 504 contains the label index. The label name is stored in the value field of the label data structure associated with the fourth node 504, as discussed above.

The fifth node 505 contains the assembler directive .word 10. The assembler directive name is stored in the value field of assembler directive data structure associated with the fifth node 505. This assembler directive has one parameter, "10", associated with it, which is stored in the parameter list associated with the fifth node 505.

The sixth node 506 contains the assembler directive .text, which has no parameters. The assembler directive name is stored in the value field of assembler directive data structure associated with the sixth node 506.

The seventh node 507 contains the assembler directive .globl function. The assembler directive name is stored in the value field of assembler directive data structure associated with the seventh node 507. This assembler directive has one parameter, "function", associated with it, which is stored in the parameter list associated with the seventh node 507.

The eighth node 508 contains the assembler directive .ent function. The assembler directive name is stored in the value field of assembler directive data structure associated with the eighth node 508. This assembler directive has one parameter, "function", associated with it, which is stored in the parameter list associated with the eighth node 508.

The ninth node 509 contains the label function. The label name is stored in the value field of the label data structure associated with the ninth node 509, as discussed above.

The tenth node 510 contains the assembler instruction lw $2, var+0x0001. The assembler instruction has two operands, "$2" and "var+0x0001". The first operand "$2" has one element, "$2". The second operand "var+0x0001" has two elements, "var" and "0x0001". The assembler instruction name is stored in the mnemonic field of the assembler instruction data structure associated with the tenth node 510. The two operands are stored in the operands list associated with the tenth node 510. The elements of each operand are stored in an elements list associated with the corresponding operand entry of the operands list.

The eleventh node 511 contains the assembler instruction lw $3, index. The assembler instruction has two operands, "$3" and "index". The first operand "$3" has one element, "$3". The second operand "index" has one element, "index". The assembler instruction name is stored in the mnemonic field of the assembler instruction data structure associated with the eleventh node 511. The two operands are stored in the operands list associated with the eleventh node 511. The elements of each operand are stored in an elements list associated with the corresponding operand entry of the operands list.

The twelfth node 512 contains the assembler instruction addu $2, $2, 5 ($3). The assembler instruction has three operands, "$2", "$2", and "5($3)". The first operand "$2" has one element, "$2". The second operand "$2" also has one element, "$2". The third operand "5($3)" has two elements, "5" and "$3". The assembler instruction name is stored in the mnemonic field of the assembler instruction data structure associated with the twelfth node 512. The three operands are stored in the operands list associated with the twelfth node 512. The elements of each operand are stored in an elements list associated with the corresponding operand entry of the operands list.

The thirteenth node 513 contains the assembler instruction sw $2, var. The assembler instruction has two operands, "$2" and "var". The first operand "$2" has one element, "$2". The second operand "var" has one element, "var". The assembler instruction name is stored in the mnemonic field of the assembler instruction data structure associated with the thirteenth node 513. The two operands are stored in the operands list associated with the thirteenth node 513. The elements of each operand are stored in an elements list associated with the corresponding operand entry of the operands list.

The fourteenth node 514 contains the assembler instruction j $31. The assembler instruction has one operand, "$31". The operand "$31" has one element, "$31". The assembler instruction name is stored in the mnemonic field of the assembler instruction data structure associated with the fourteenth node 514. The operand is stored in the operands list associated with the fourteenth node 514. The element of the operand is stored in an elements list associated with the corresponding operand entry of the operands list.

The fifteenth node 515 contains the assembler directive .end function. The assembler directive name is stored in the value field of assembler directive data structure associated with the fifteenth node 515. This assembler directive has one parameter, "function", associated with it, which is stored in the parameter list associated with the fifteenth node 515.

Finally, the sixteenth node 516 contains the assembler directive .extern var, 4. The assembler directive name is stored in the value field of assembler directive data structure associated with the sixteenth node 516. This assembler directive has two parameters, "var" and "4", associated with it, which are stored in the parameter list associated with the sixteenth node 516.

Once the main data structure has been populated with the assembler instructions, the translator then performs several successive operations on the main data structure. The particular operations performed on the main data structure depend upon the specific nature of the target architecture and the specific information that the system designer wishes to gather from the simulation. Exemplary operations that the translator performs include: macro expansion, instruction dependency resolution, extraction of symbols into a symbol table, label identification, simulation model generation, simulation model assembly, and simulation model output. All of these phases use information about the target architecture, applied to the main data structure, to further refine the simulation model.

Figure 6:
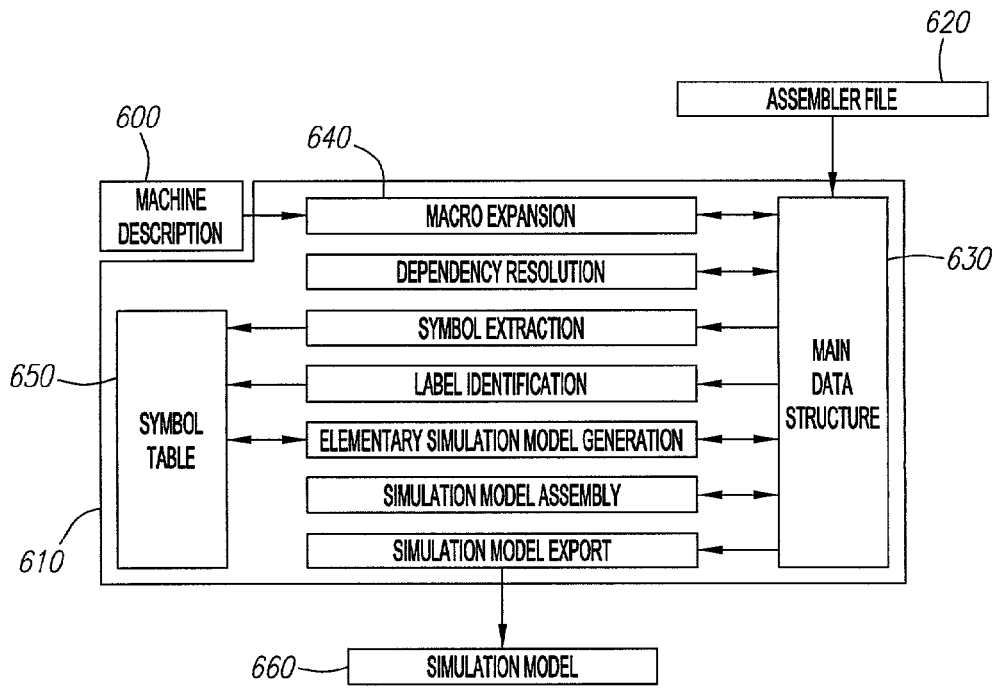
FIG. 6 is a diagram of the processing stages of a translator in accordance with an embodiment of the invention.

An exemplary set of phases of the generation of the simulation model is shown in FIG. 6. An architecture description 600 is provided to the translator 610. The translator 610 also receives as input an assembler file 620. The translator populates a main data structure 630 with the various assembler elements, as discussed above. The translator then proceeds with a series of operations 640 on the main data structure 630.

The first operation performed on the main data structure 630 is a macro expansion operation. Depending on the particular architecture description 600 used in the translator, some of the assembler instructions are expanded into multiple instructions. For example, referring to an exemplary assembler fragment in Table 1, in a MIPS architecture an assembler instruction lw $3, var is expanded into two instructions; a lui instruction and a different lw instruction, which together replace the original lw instruction.

TABLE 1

| MIPS assembler | Macro expansion | Dependency Resolution |
|---|---|---|
| lw $3, var | lui $1, 0 | lui $1, 0 |
| | lw $3, var($1) | lw $3, var($1) |
| | | nop |
| .set noreorder | .set noreorder | .set noreorder |
| bne $3, label | bne $3, label | bne $3, label |
| addu $4, $4, 2 | addu $4, $4, 2 | addu $4, $4, 2 |
| or $5, $5, $4 | or $5, $5, $4 | or $5, $5, $4 |
| .set reorder | .set reorder | .set reorder |
| Dependency Resolution | Elementary simulation model generation | Simulation model assembly |
| lui $1, 0 | lui $1, 0 | _R1 = 0 << 16; |

TABLE 1-continued

| | D = 0, _R1 = 0 << 16; | |
|---|---|---|
| lw $3, var($1) | lw $3, var($1) | _R3 = *((*int) (&var + _R1)); |
| | D = 0, _R3 = *((*int) (&var + _R1)); | |
| nop | nop | _R0 = _R0 << _R0; |
| | D = 0, _R0 = _R0 << _R0; | |
| .set noreorder | .set noreorder | |
| bne $3, label | bne $3, label | _TEST = (_R3 != 0); |
| | D = 0, _TEST = (_R3 != 0); | |
| | D = 2, if (_TEST) goto label; | |
| addu $4, $4, 2 | addu $4, $4, 2 | _R4 = _R4 + 2; |
| | D = 0, _R4 = _R4 + 2; | |
| or $5, $5, $4 | or $5, $5, $4 | if (_TEST) goto label; _R5 = _R5 | _R4 |
| | D = 0, _R5 = _R5 | _R4 | |
| .set reorder | .set reorder | |

The second operation performed on the main data structure 630 is a dependency resolution operation. In this operation, resource conflicts are resolved. In an embodiment, the translator builds a list of reserved resources for each instruction by looking up information about how the instruction is implemented in the target architecture and combining this with the operand list for that instruction, to generate a list of resources the instruction uses and the number of time slots these resources are required for. The translator then parses each assembler instruction in the main data structure and checks to see which resources the instruction needs access to, in order to successfully execute.

For each instruction, the translator checks the reserved resource lists for the prior instructions. If the instruction needs a resource that is on the reserved resource list of a prior instruction, and the instruction is within the range of time slots specified by the prior instruction's reserved resource list, then the instruction is delayed by inserting one or more nop instructions into the main data structure, before the instruction. If there are no resource dependencies, then no action is taken.

In an alternate embodiment, the translator combines the reserved resource building step and the needed resources step. In this embodiment, for each instruction the translator checks to see whether the instruction can be executed, and then if it can be executed, generates a reserved resources list for the instruction.

In the example of Table 1, there is a dependency on register $3 between the lw and bne instructions. The bne instruction depends on the value stored in register $3, thus $3 is on its needed list. At the moment of execution, however, $3 is still locked by the preceding lw instruction, which has $3 on its reserved list. In the MIPS architecture, the lw instruction has a delay of one instruction slot. Therefore the translator inserts a single nop instruction into the main data structure, as shown in the Dependency Resolution column of Table 1. This allows for a write-back to $3 before the register is used by the bne instruction.

The third and fourth operations extract information from the main data structure to build a symbol table 450. The symbol table 450 contains an entry for every symbol in the assembler. When building the symbol table, the translator will make use of assembler directives, such as .text or .data, to decide which type of symbol a given label represents. For example, where the label is in the scope of a .text assembler directive, the translator assumes that the label represents a jump point. Where the label is in the scope of a .data assembler directive, the translator assumes that the label represents a variable.

For each symbol, the symbol table 450 stores information such as the assembler name of the symbol, the simulation model name of the symbol (the name that will be output in the simulation model by the translator), the symbol type (if the symbol designates a function, a control flow label, or a variable), and for a variable the storage type (extern, static, etc.) and the storage size (char, short, int, etc.). Another entry for each symbol in the symbol table is the list of simulation models for the given symbol. For example, if the symbol is a function, then three models are provided in the symbol table: the function opening (such as 'int f (void) {'), the closure (typically a '}'), and the calling model (such as 'f ( )').

The fifth operation performed on the main data structure is the elementary simulation model generation operation. This is the operation where each instruction is replaced with the model for that instruction, as expressed in the output language used to represent the simulation model. In an embodiment, that output language is assembler-level C code.

Most instructions have a single model associated with the instruction, and the instruction behavior occurs on the same time slot as the instruction itself. This is represented in Table 1 as D=0 (delay is zero slots from the instruction). Conditional instructions with delay slots may have more than one model for the instruction, and the models may be executed in different time slots. For example, in Table 1 the bne instruction has two models for the two behaviors of interest. The first model is the evaluation of the branch condition, _TEST=(_R3 !=0); , which is done at the time the instruction is first seen (D=0). The other model of the bne instruction is the conditional jump itself, if (TEST) goto label; which uses the result of the condition evaluation to decide whether to change the execution flow. The second model ends up in the time slot that follows the time slot assigned to the instruction in the bne instruction's delay slot (D=2).

The sixth operation performed on the main data structure is the simulation model assembly operation. This is the operation where the main data structure is re-ordered to properly reflect in the output language the temporal sequence of the assembler input, so that the functionality of the assembler input is preserved in the output. In the example of Table 1, this operation causes the second model for the bne instruction to be placed in the slot following the delay slot for the bne instruction. This is also the operation where the main data structure is re-ordered using any applicable assembler re-ordering conventions. For example, where a first assembler instruction has a delay slot, the immediately preceding assembler instruction will be moved into the first assembler instruction's delay slot, unless the first assembler instruction is within the scope of a .noreorder assembler directive.

The seventh and final operation of FIG. 4 is the simulation model output operation. This operation outputs the simulation model 460, with annotations based on the timing information, bus transaction information, or other information as selected by the system designer. In an embodiment, the simulation model is output in assembler-level C code. The simulation model output for the assembler of Table 1 is shown in Table 2.

TABLE 2

| | |
|---|---|
| DELAY(lui); | _R1 = 0 << 16; |
| DELAY(lw); | _R3 = *((*int) (&var + _R1)); |
| DELAY(nop); | _R0 = _R0 << _R0; |
| DELAY(bne); | _TEST = (_R3 != 0); |

TABLE 2-continued

| | | |
|---|---|---|
| DELAY(addi); | // if (__TEST) goto label; deferred<br>__R4 = __R4 + 2;<br>if (__TEST) goto label; | |
| DELAY (or); | __R5 = __R5 \| __R4; | |

Other operations performed on the main data structure are also contemplated, depending upon the information desired to be gathered from the simulation model. For example, in an embodiment where the target architecture uses condition codes, an operation is performed on the main data structure to process changes to the condition codes. Once all desired operations are performed on the main data structure, the simulation model source code is then compiled and executed on the simulator, as discussed above.

In the following sections, solutions to several problems involved with the approach discussed above for an embodiment of the invention will be discussed in more detail. The target processor used in the following examples is a MIPS R3000 RISC processor, but the same considerations apply to most modern processors.

Delay Slots

Delay slots expose the pipeline behavior in order to allow the compiler writer or assembler programmer to exploit the pipeline performance with a simple run-time instruction execution control.

R3000 has delay slots after all jumps and loads. Since MIPS R3000 is not fully interlocked, the compiler, or at least the assembler, has to make sure that the load delay slot instructions do not use the target of a preceding load, otherwise the results are unpredictable. If no such instruction can be found to fill the delay slot, a no-operation (nop) instruction is used.

Whereas the load instructions are translated into the simulation model sequentially, inserting a nop wherever appropriate, the jump instructions are an issue when generating the simulation model. These instructions alter the flow of the program. The assembler is generated in such a way that the instruction in the delay slot gets executed before the branch takes effect. For example, the branch instruction shown in Table 3 executes the subtraction, then the addition, and then the jump (return) instruction.

TABLE 3

| | | |
|---|---|---|
| sub | $2, $1, $3 | ;subtraction instruction on MIPS |
| j | $31 | ;return instruction on MIPS |
| add | $2, $2, 3 | ;addition instruction on MIPS |

To preserve this behavior in the simulation model, this assembler code is modeled as shown in Table 4.

TABLE 4

| | |
|---|---|
| __R2 = __R1 − __R3; | //subtraction<br>//return; defered |
| __R2 = __R2 + 3; | //addition |
| return; | //jump |

Indirect Jumps

There are some control instructions for which the target cannot be calculated at translation time. An example of this sort of control instruction is an indirect jump, where the target address is picked from a register or memory location at run time. In an embodiment, for a correct modeling of indirect jumps, a run-time construct is created to make the conversion from numerical addresses to symbolic locations in the simulation model. Such constructs may be represented in C by a switch statement.

Prior to building the simulation model, all possible address destinations of the indirect jumps are listed and associated with a symbol. One way to achieve this is by annotating every instruction of the assembler source with a unique label and then assembling it to an object file. From the object file, the numeric address associated with each label (instruction) is extracted. A conversion table from symbolic labels to program space addresses is built for the compiler preprocessor on the simulator host machine. An exemplary conversion table is shown in Table 5 below.

TABLE 5

| #define | __LSW1 | 0x0001 |
|---|---|---|
| #define | __LSW2 | 0x0002 |
| #define | __LSW3 | 0x0003 |

These definitions are included on top of the simulation model, thus translating all symbolic tags into numeric constants. The same set of labels are used as selectors in the switch statement in the simulation model, each translated instruction being preceded by the corresponding label from the annotated assembler source, as shown in Table 6 below. The left-hand column is the annotated assembler source, and the right-hand column is the corresponding simulation model.

TABLE 6

| | | |
|---|---|---|
| | | __PC = __LSW1;<br>for (;;)<br>switch (__PC) { |
| __LSW1: | | case __LSW1: |
| lw | $4, proc | __R4 = * (int*) (& proc ) ; |
| __LSW2: | | case __LSW2: |
| j | $4 | //deferred jump<br>__VCC__lbv = __R4; |
| __LSW3: | | case __LSW3: |
| subu | $sp, $sp, 24 | __SP = __SP − 24 ;<br>__PC = __VCC__lbv ; break ; |
| ... | | ...<br>} |

As long as no indirect jumps are encountered, the program flow falls smoothly through the switch cases. When an indirect jump occurs, the simulation model saves the destination address into a temporary variable and, after execution of the delay slot instruction, sets the __PC variable to the saved value and breaks out of the switch statement. Since the whole switch statement is inside an endless loop, the switch will automatically be re-entered at the indirect jump target point. Thus, during the simulation, the only overhead is the update of the local variable __PC and the execution of the switch at each jump statement.

In another embodiment, when something is known about the compiler code optimization strategy, indirect jumps are handled in a more efficient manner. For example, in compiled code, indirect jumps are used in conjunction with a jump table produced for switch statements. A jump table is a list of absolute addresses. The target of the jump is retrieved from the jump table by using a register value as an index on the jump table. If the jump table can be identified, for example by parsing the assembler to recognize patterns that identify a jump table, the jump addresses can be captured, the relative addresses can be computed at translation time and the translated indirect jump instruction will work correctly at runtime.

In yet another embodiment, indirect jumps are handled by using the computed goto extension of the C language, offered by the GCC compiler. When the source code is compiled by the GCC compiler, the indirect jumps are converted into GCC computed goto constructs, which allow the possible jump addresses to be computed at translation time, and the translated indirect jump instruction will work correctly at runtime.

Calling Conventions

Compilers can use different calling techniques for different architectures. Exemplary calling techniques include: using the stack, registers, register windows, etc. For example, the SPARC architecture uses overlapping windows to make fast procedure calls, whereas some MIPS architecture compilers perform an inter-procedural register allocation, which allows the simulation of the run-time stack by the compile-time assignment of (packed) variables to registers.

In an embodiment, a simulation model includes both translated functions and non-translated functions. It is not easy to interface translated and non-translated functions, because the host machine, where the simulation model will be run, and the target machine, where the final executable will be run, may use the stack differently. There are four distinct cases, depending on whether the caller and/or callee are translated from assembler back to source code, such as C, or not.

The first, and most trivial, case is when both are not translated. No special action is required. The second case is when both caller and callee are translated. In this case the simulation model will use emulated registers and stack to pass arguments back and forth just as the program on the target architecture does.

The third case is where only the caller has been translated. In this case, the callee (for example a hand-estimated library function) expects the arguments in the host's calling convention. Straight translation of the caller would result in the arguments being provided in the target's calling convention. This mismatch is corrected by identifying the actual arguments expressed in the target's calling convention (they may be placed into emulated registers, specific stack locations, etc.). The arguments are then translated back into a source-code-like call using the arguments as expressed in the target convention. The host compiler then compiles the source-code-like call, using the host's calling convention.

For example, MIPS places the first four integer-sized arguments into general purpose registers 4-8, in this order, and then uses stack locations for any remaining arguments. If the callee expects, for example, two integer arguments, as in the example function of Table 7 below, the simulation model generator identifies this by examining the function prototype for callee_function.

TABLE 7 int callee_function (int a, int b);

The simulation model, as shown in Table 8 below, then becomes:

TABLE 8

_R2 = callee_function (_R4, _R5);

where _R2, _R4, and _R5 are emulated registers. We are assured that the simulation model, which is derived step by step from the target assembler, has already loaded into registers _R4 and _R5 the actual values of arguments a and b.

The previous example also shows how the return value of a non-translated callee is identified. Again, the calling convention of MIPS explains that an integer-sized return value is expected to be placed into general-purpose register 2.

The fourth and final case is when only the callee has been translated. Since the caller is not translated, it will use the host's calling convention. Thus while generating the callee code, a prologue is added with instructions that intercept the arguments transferred using the host's calling convention and move them to where the translated callee expects them, as shown in Table 9 below.

TABLE 9

```
/*  Translated callee to be called       */
/*  from non_translated functions        */
/*  using host calling convention        */
void f(int a, int b)
{
_R4 = a; /*   Conversion from host to    */
_R5 = b; /*   target calling convention */
/* Body of the function */
}
```

If, during program execution, the callee can also be called by translated caller functions, the code of the callee is duplicated (with a different name), without the code to intercept the arguments passed using the host's calling convention, as shown in Table 10 below.

TABLE 10

```
/*  Translated callee to be called       */
/*  from translated functions            */
/*  using target calling convention      */
void my_f(void)
{
/*   No calling convention */
/* conversion is required */
/*   Body of the function */
}
```

Then, for every translated caller function in the rest of the program, we just call the copy, as shown in Table 11 below.

TABLE 11

```
/* Translated code */
void my_f(void);        /* Prototype of the copy        */
/* of the callee                       */
...
_R4 = 12;               /* C simulation model           */
...                     /* reconstructed from           */
_R5 = d +23;            /* target assembler             */
my_f( );                /* Calling the copy of the callee. */
/* Arguments passed using target's    */
/* calling convention, through        */
/* emulated registers and stack.      */
```

Condition Codes

While RISC processors often do not use condition codes, several older architectures, such as x86, use them extensively. Therefore, an efficient solution for translating condition codes into the simulation model is provided.

Various condition codes can be set by several assembler instructions. On the hardware side, setting condition codes comes at no cost in terms of speed. The simulation model, however, must execute special code for emulating condition codes. Generating the emulation code for every instruction that alters the condition codes on the processor is a waste of time, since the condition codes are actually used much less frequently than they are set.

When the assembler output is parsed, an internal representation of the simulation model is created in the main data structure of the translator, as discussed above. In an embodiment where the target architecture uses condition codes, this representation includes all condition code updates. Before the simulation model is output, a data flow analysis is performed on the condition codes. Only the condition code settings that conservatively have a chance to be used by a subsequent instruction are flagged as useful. When the model is output, emulation code is generated for only the flagged updates of the condition codes, thus reducing useless emulation code that sets condition codes which are never used.

Memory Access

The simulation model has direct access to the memory of the host machine. The approach of an embodiment of the invention supports a mix of translated and non-translated functions, which share variables, some with several redirection levels. In an embodiment using C as the simulation model language, uninitialized local, local common, and external variable declarations are converted to arrays of chars in the translated simulation model. There is no need for more specific type definition at declaration time, since the translator provides appropriate casts in all translated elements.

Symbols are always used in the assembler code either for their address or for their value. The assembler source already provides the instructions for correctly accessing struct fields, vector elements, pointer dereference, etc., starting from the base symbol address, with appropriate address offsets.

The type char[ ] was chosen for two main reasons. First, this type offers maximum flexibility to cover the actual size of the variable. For example, an int in the original source is declared as a char[4] in the translated code, where 4 is the size of an int on the target machine. If a program includes translated and non-translated functions, then the target and host machines need to have the same representation for the basic storage types: the same size for ints, shorts, same representation for the floating point types, etc., and the same endianness', at least for the variables shared between translated and non-translated functions.

Second, when the symbolic name of a variable is used as a base address to which an offset is added, then the standard C behavior is to increment by (offset)×(size_of_the_base_type). The assembler always assumes that the increment is only of offset bytes. Thus, we choose the base type size of one byte to easily translate this addressing mode.

All the symbols referenced in the assembler that are not declared in the file are assumed to be extern (although some compilers, such as GCC, do declare the extern symbols using an assembler directive) and are declared in the header file as extern ints. There is no need to provide an accurate size for them, since the memory allocation is made elsewhere.

Stack Modeling

The stack for the simulation model is emulated as a vector of the type assumed by the stack pointer on the target CPU, and the stack pointer register becomes a pointer to the elements of this array. The emulated stack is used by the translated functions of the program, as noted above in discussing the calling convention issues.

Debugging

Both the target and the host compilers should be used with the debug option activated, in order to get all the necessary information for debugging of the simulation model. However, if the optimization flags are in effect for both the host and target compilers, the debugging may be difficult as the code will be re-arranged twice, by the optimizers of both the target and host compilers.

To correct this problem, the original source name and line numbers are extracted from the assembler file by the translator, and inserted in the appropriate places in the simulation model using compiler directives such as #line. This ensures the correct file and line cross-referencing.

Variable referencing is done using a similar approach. After the compilation of the simulation model, the symbol table of the host assembler file has to be changed to reference the names of the original (user) source variables. The symbol names should be first passed through a conversion table to undo the name transformations introduced by the model generator. For example, flattened names in the target assembler of the form <variable>.number are illegal in a simulation model using C, thus the model generator converts them to the form <variable>_number.

User Interfaces

The translator elements discussed above can be accessed by a variety of user interfaces. A first exemplary user interface is the direct use of the translator elements from user-written code modules, which are linked with the translator library. This low-level interface gives the user the best control over the details of the translator operation, but is also cumbersome, less readable, and requires a good understanding of the translator library.

A second exemplary user interface to the translator elements is through an interpreted language (such as Perl, Tcl/Tk, Python, etc.) While other user interfaces need a recompilation for changes to take effect, the interpreted interface uses the underlying interpreter to access the translator library. Moreover, the user benefits from the full power of the interpreter language, in addition to the resources specific to the tasks related to assembler manipulation and simulation model generation, provided by the translator library.

A third exemplary user interface is based on the use of XML for describing architecture-specific elements. This can be viewed as an upper abstraction level over the direct coding of the first user interface. XML constructs are used to generate architecture-specific data structures and operations, to customize the generic assembler parser, etc. This interface improves the readability of the simulation model description and is easier to maintain than direct coding. The XML interface remains compatible with direct coding, however.

The XML user interface will now be discussed in more detail, with reference to FIG. 5. In an embodiment, the functions and algorithms of the translator library are designed to work with C++ STL style containers of class instances. The instance themselves are instances of machine-dependent classes. The containers and algorithms, however, access the instances via their base classes and virtual functions, thereby allowing algorithms to deal with these instances in a machine-independent fashion. These instances are then linked into the main data structure of the translator.

Figure 7:
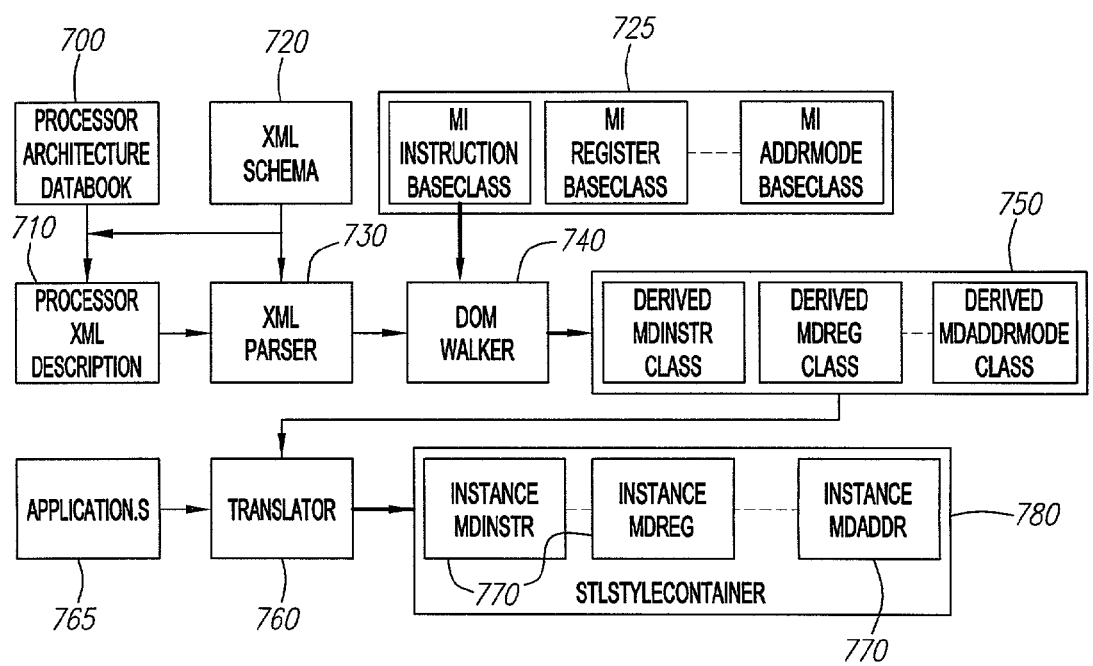
FIG. 7 is a flowchart of a method for providing a machine architecture to the translator, in accordance with an embodiment of the invention.

As shown in FIG. 7, a machine description is captured from a data book 700, into an XML machine description 710. The data book 700 is a listing of all of the pertinent attributes of a particular target architecture. The form of this XML description is defined by a machine-independent XML schema 720, which is composed of machine-independent class definitions 725 for the various elements found in the various target architectures. The XML machine description 710 is subsequently parsed and verified by an XML parser, operating in DOM (Domain Object Model) mode. The resultant DOM is treewalked by the DOM walker application 740, which in turn emits instances of the machine-dependent class definitions 750. These definitions are subsequently used by the translator 760 that processes the target assembler 765, and produces instances 770 of these machine-dependent classes, in an STL style container 780. These instances are linked into the translator data structure (not shown).

The XML description captures several pieces of information. Exemplary information items captured are presented below.

All of the resources of the target architecture, such as visible registers, internal registers, status bits, etc., that will be useful in modeling the target machine, are captured. All the information such as names, alternate names, attributes such as widths, print strings in the assembler syntax, print method names, etc. are captured. Reasonable defaults are specified for optional items, using the facilities of XML schemas.

All of the target machine addressing modes, including their syntax, print method templates, code templates (to model their behaviors) and performance model templates are captured and verified using the XML and the XML schema. Again, reasonable defaults are specified, using the facilities of XML schemas.

All the instructions of the target machine are captured, including their syntaxes, alternate mnemonics, allowable operands, etc. Their code templates (to model behavior) and delay templates (to capture performance models in various contexts) are captured and verified using XML and the XML schema.

All the pseudo-instructions and assembler directives of interest are captured. Some of these items carry code templates (to model their behaviors), while other items trigger macro-like expansions in latter processing steps of the translator internal data structures.

In summary, XML allows for capturing of all the required modeling data and relationships in a machine-independent and standards conforming notation.

System Architecture Overview

Figure 8:
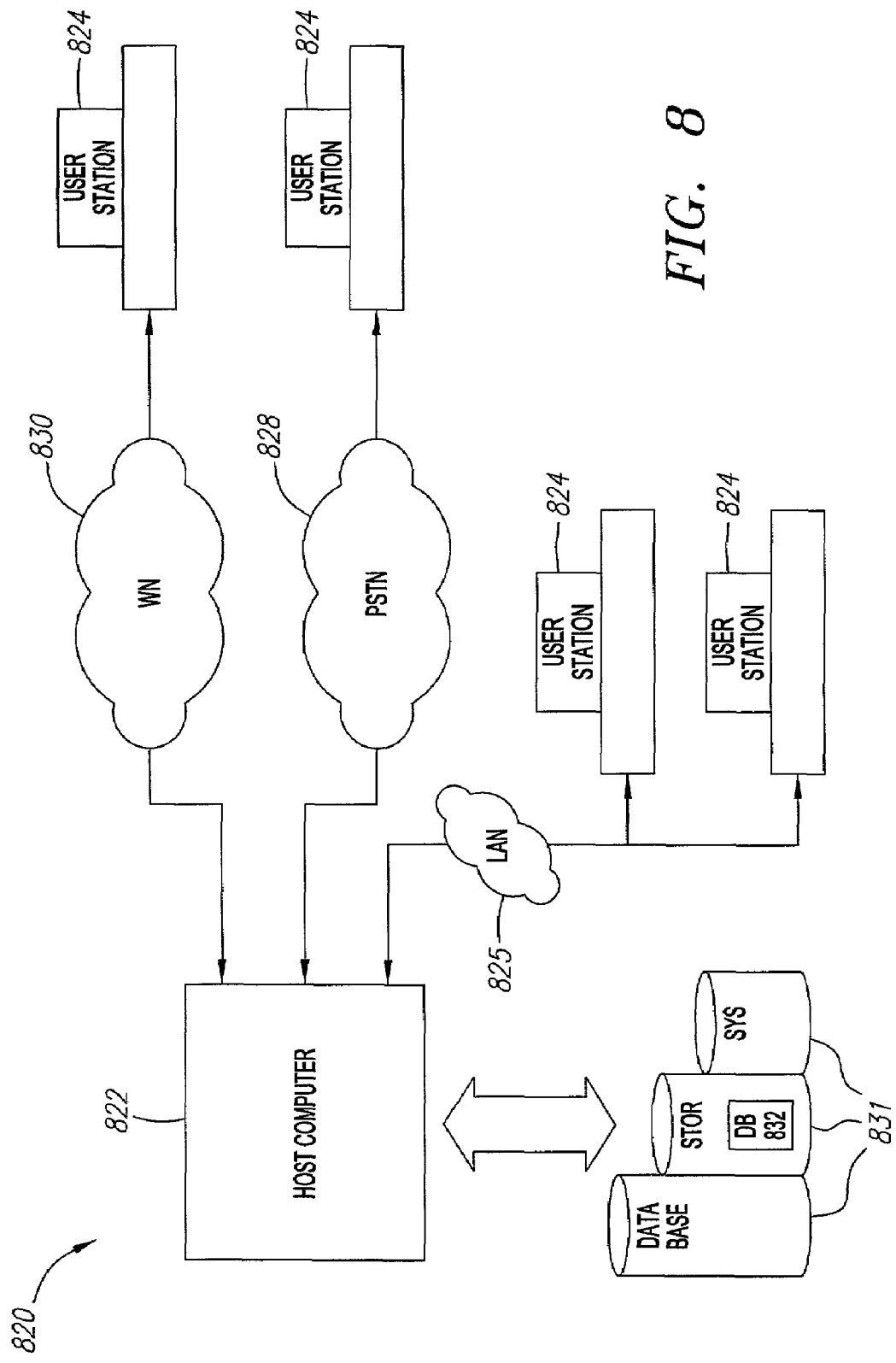
FIG. 8 is a representation of a computer system in accordance with an embodiment of the invention.

Referring to FIG. 8, in an embodiment, a computer system 820 includes a host computer 822 connected to a plurality of individual user stations 824. In an embodiment, the user stations 824 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 824 are connected to the host computer 822 via a local area network ("LAN") 825. Other user stations 824 are remotely connected to the host computer 822 via a public telephone switched network ("PSTN") 828 and/or a wireless network 830.

In an embodiment, the host computer 822 operates in conjunction with a data storage system 831, wherein the data storage system 831 contains a database 832 that is readily accessible by the host computer 822.

In alternative embodiments, the database 832 may be resident on the host computer, stored, e.g., in the host computer's ROM, PROM, EPROM, or any other memory chip, and/or its hard disk. In yet alternative embodiments, the database 832 may be read by the host computer 822 from one or more floppy disks, flexible disks, magnetic tapes, any other magnetic medium, CD-ROMs, any other optical medium, punch-cards, papertape, or any other physical medium with patterns of holes, or any other medium from which a computer can read.

In an alternative embodiment, the host computer 822 can access two or more databases 832, stored in a variety of mediums, as previously discussed.

Figure 9:
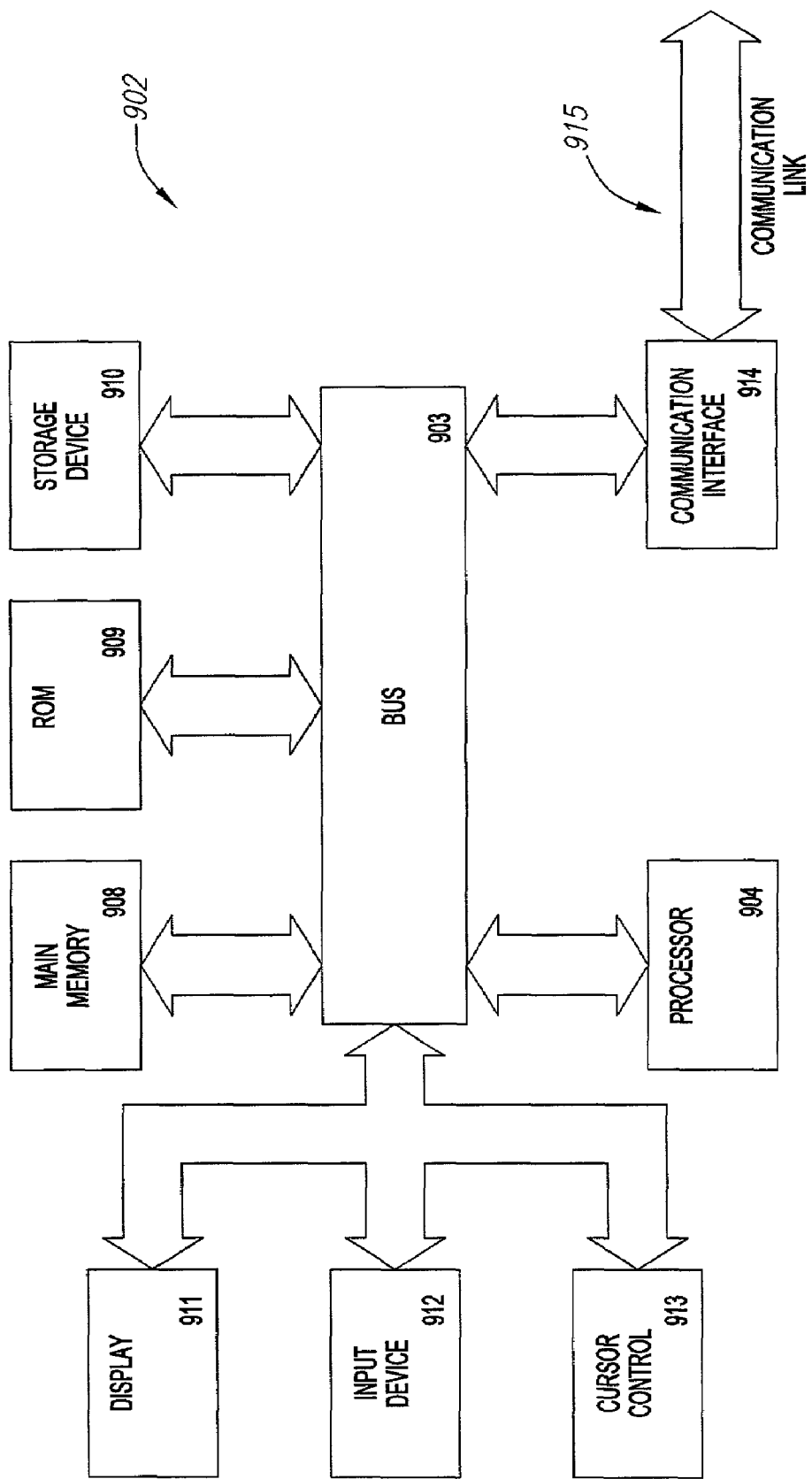
FIG. 9 is a representation of a processing unit in accordance with an embodiment of the invention.

Referring to FIG. 9, in an embodiment, each user station 824 and the host computer 822, each referred to generally as a processing unit, embodies a general architecture 902. A processing unit includes a bus 903 or other communication mechanism for communicating instructions, messages and data, collectively, information, and one or more processors 904 coupled with the bus 903 for processing information. A processing unit also includes a main memory 908, such as a random access memory (RAM) or other dynamic storage device, coupled to the bus 903 for storing dynamic data and instructions to be executed by the processor(s) 904. The main memory 908 also may be used for storing temporary data, i.e., variables, or other intermediate information during execution of instructions by the processor(s) 904.

A processing unit may further include a read only memory (ROM) 909 or other static storage device coupled to the bus 903 for storing static data and instructions for the processor(s) 904. A storage device 910, such as a magnetic disk or optical disk, may also be provided and coupled to the bus 903 for storing data and instructions for the processor(s) 904.

A processing unit may be coupled via the bus 903 to a display device 911, such as, but not limited to, a cathode ray tube (CRT), for displaying information to a user. An input device 912, including alphanumeric and other keys, is coupled to the bus 903 for communicating information and command selections to the processor(s) 904. Another type of user input device may include a cursor control 913, such as, but not limited to, a mouse, a trackball, a fingerpad, or cursor direction keys, for communicating direction information and command selections to the processor(s) 904 and for controlling cursor movement on the display 911.

According to one embodiment of the invention, the individual processing units perform specific operations by their respective processor(s) 904 executing one or more sequences of one or more instructions contained in the main memory 908. Such instructions may be read into the main memory 908 from another computer-usable medium, such as the ROM 909 or the storage device 910. Execution of the sequences of instructions contained in the main memory 908 causes the processor(s) 904 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 904. Such a medium may take many forms, including, but not limited to, non-volatile, volatile and transmission media. Non-volatile media, i.e., media that can retain information in the absence of power, includes the ROM 909. Volatile media, i.e., media that can not retain information in the absence of power, includes the main memory 908. Transmission media includes coaxial cables, copper wire and fiber optics, including the wires that comprise the bus 903. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 904 can retrieve information.

Various forms of computer-usable media may be involved in providing one or more sequences of one or more instructions to the processor(s) 904 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 903 may receive the infrared signals and place the instructions therein on the bus 903. The bus 903 may carry the instructions to the main memory 908, from which the processor(s) 904 thereafter retrieves and executes the instructions. The instructions received by the main memory 908 may optionally be stored on the storage device 910, either before or after their execution by the processor(s) 904.

Each processing unit may also include a communication interface 914 coupled to the bus 903. The communication interface 914 provides two-way communication between the respective user stations 824 and the host computer 822. The communication interface 914 of a respective processing unit transmits and receives electrical, electromagnetic or optical signals that include data streams representing various types of information, including instructions, messages and data.

A communication link 915 links a respective user station 824 and a host computer 822. The communication link 915 may be a LAN 825, in which case the communication interface 914 may be a LAN card. Alternatively, the communication link 915 may be a PSTN 828, in which case the communication interface 914 may be an integrated services digital network (ISDN) card or a modem. Also, as a further alternative, the communication link 915 may be a wireless network 830.

A processing unit may transmit and receive messages, data, and instructions, including program, i.e., application, code, through its respective communication link 915 and communication interface 914. Received program code may be executed by the respective processor(s) 904 as it is received, and/or stored in the storage device 910, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

We claim:

1. A computer implemented method for performing performance analysis for a target machine which comprises a software portion and a hardware portion, comprising:

describing a design for the target machine as a network of logical entities;

selecting at least one of the logical entities for a software implementation;

implementing a source software program for the logical entities selected for the software implementation;

generating an optimized assembler code for the software program, wherein the optimized assembler code is an assembly-language representation of the software implementation;

performing a performance analysis using the optimized assembler code, wherein the act of performing the performance analysis is performed by a processor;

generating a software simulation model in a high level language format based at least in part upon the optimized assembler code by annotating the software simulation model with information related to hardware on which the software implementation runs based at least in part upon a result of the act of performing the performance analysis to capture a dynamic interaction between tasks during runtime, wherein the act of annotating the software simulation model is performed during a time of the act of generating the software simulation model;

storing the software simulation model on a computer usable storage medium;

generating a hardware and software co-simulation model using the software simulation model; and storing at least the hardware and software co-simulation model on the computer usable storage medium or a second computer usable storage medium or displaying the at least the hardware and software co-simulation model on a display apparatus.

2. The method of claim 1, wherein the act of generating the software simulation model further comprises incorporating a description of the target machine.

3. The method of claim 1, further comprising selecting at least one of the network of logical entities for a hardware implementation, and using an existing software model of the hardware implementation from the at least one of the network of logical entities, wherein the hardware and software co-simulation model is generated using the existing software model of the hardware implementation.

4. The method of claim 1, wherein the performance analysis measures an execution time of an element of the assembler code.

5. The method of claim 1, wherein the software program is compiled using a same compiler used to compile a production executable.

6. The method of claim 1, wherein the act of performing the performance analysis comprises annotating the optimized assembler code with performance information.

7. The method of claim 6, wherein the performance information comprises timing information.

8. The method of claim 1, wherein the act of generating the optimized assembler code comprises disassembling a software binary code to assembly code.

9. A computer implemented method of preparing software for a performance estimation, comprising:

obtaining a software assembly code module from a source code module, wherein the software assembly code module is an assembly-language representation;

generating a software simulation model in a high level language format by disassembling a binary code, wherein the software assembly code module comprises the binary code, and the act of generating the software simulation model is performed by a processor;

annotating the software simulation model with performance information of hardware together with which the software simulation model runs to capture a dynamic interaction between tasks during runtime, wherein the act of annotating the software simulation model is performed during a time of the act of generating the software simulation model; and storing at least the software simulation model on a computer usable storage medium or displaying the at least the software simulation model on a display apparatus, wherein the software simulation model is an assembler-level software simulation model, expressed in a high-level programming language.

10. The method of claim 9, wherein the act of obtaining the software assembly code module comprises compiling software source code to assembly.

11. The method of claim 10, wherein the software assembly code module is compiled using a compiler adapted to create code that will execute on a first machine architecture.

12. The method of claim 11, wherein the performance information is associated with the first machine architecture.

13. The method of claim 11, wherein the software simulation model is compiled to execute on a second machine architecture, the second machine architecture being different from the first machine architecture.

14. The method of claim 9, wherein the high-level programming language comprises a C code programming language.

15. The method of claim 9, wherein the act of generating the software simulation model further comprises gathering information from the source code module from which the software assembly code module was obtained.

16. The method of claim 15, wherein the information gathered comprises high-level hints about the software assembly code module.

17. The method of claim 9, wherein the performance information comprises estimated performance information.

18. The method of claim 9, wherein the performance information is statically estimated.

19. The method of claim 9, wherein the performance information is dynamically computed at run-time, using a formula provided during the act of annotating.

20. The method of claim 9, further comprising:
compiling the software simulation model to a simulator host program; and
executing the simulator host program on a simulator to allow one or more performance measurements to be taken.

21. The method of claim 20, further comprising linking an already-annotated module with the software simulation model.

22. A computer program product that includes a computer usable storage medium, the computer usable storage medium comprising a sequence of instructions which, when executed by a processor, causes said processor to execute a process for performing software performance analysis for a target machine, the process comprising:
describing a system design as a network of logical entities;
selecting at least one of the logical entities for a software implementation;
implementing a source software program for the logical entities selected for the software implementation;
generating an optimized assembler code for the software program, wherein the optimized assembler code is an assembly-language representation of the software implementation;
performing a performance analysis using the optimized assembler code, wherein the act of performing the performance analysis is performed by a processor;
generating a software simulation model in a high level language format based at least in part upon the optimized assembler code by annotating the software simulation model with information related to hardware on which the software implementation runs based at least in part upon a result of the act of performing the performance analysis to capture a dynamic interaction between tasks during runtime, wherein the act of annotating the software simulation model is performed during a time of the act of generating the software simulation model;
storing the software simulation model on a computer usable storage medium;
generating a hardware and software co-simulation model using the software simulation model; and
storing at least the hardware and software co-simulation model on the computer usable storage medium or a second computer usable storage medium or displaying the at least the hardware and software co-simulation model on a display apparatus.

23. The computer program product of claim 22, wherein the act of generating the optimized assembler code further comprises incorporating a description of the target machine.

24. The computer program product of claim 22, the process further comprising selecting at least one of the logical entities for a hardware implementation, and synthesizing a software model of the hardware implementation from the selected logical entities, wherein the hardware and software co-simulation model is generated using the software model of the hardware implementation.

25. The computer program product of claim 22, wherein the performance analysis measures an execution time of an element of the assembler code.

26. The computer program product of claim 22, wherein the software program is compiled using a same compiler used to compile a production executable.

27. The computer program product of claim 22, wherein performing the performance analysis comprises annotating the optimized assembler code with performance information.

28. The computer program product of claim 27, wherein the performance information comprises timing information.

29. A computer program product that includes a computer usable storage medium, the medium comprising a sequence of instructions which, when executed by a processor, causes a processor to execute a process for preparing software for a performance estimation, the process comprising:
obtaining a software assembly code module from a source code module, wherein the software assembly code module is an assembly-language representation;
generating a software simulation model in a high level language format, wherein the software assembly code module comprises a binary code, and the act of generating the software simulation model is performed by a processor;
annotating the software simulation model with performance information of hardware together with which the software simulation model runs to capture a dynamic interaction between tasks during runtime, wherein the act of annotating the software simulation model is performed during a time of the act of generating the software simulation model; and
storing at least the simulation model on a computer usable storage medium or displaying the at least the software simulation model on a display apparatus, wherein the software simulation model is an assembler-level software simulation model, expressed in a high-level programming language.

30. The computer program product of claim 29, wherein obtaining the software assembly code module comprises compiling software source code to assembly.

31. The computer program product of claim 30, wherein the software assembly code module is compiled using a compiler adapted to create code that will execute on a first machine architecture.

32. The computer program product of claim 31, wherein the performance information is associated with the first machine architecture.

33. The computer program product of claim 31, wherein the software simulation model is compiled to execute on a second machine architecture, the second machine architecture being different from the first machine architecture.

34. The computer program product of claim 29, wherein the act of obtaining the software assembly code module comprises disassembling a software binary code to assembly code.

35. The computer program product of claim 29, wherein the high-level programming language comprises a C code programming language.

36. The computer program product of claim 29, wherein the process further comprises gathering information from the source code module from which the assembly code module was obtained.

37. The computer program product of claim 36, wherein the information which is gathered comprises high-level hints about the software assembly code module.

38. The computer program product of claim 29, wherein the performance information comprises estimated performance information.

39. The computer program product of claim 29, wherein the performance information is statically estimated.

40. The computer program product of claim 29, wherein the performance information is dynamically computed at runtime, using a formula provided during a time of the act of annotating.

41. The computer program product of claim 29, the process further comprising:
compiling the software simulation model to a simulator host program; and
executing the simulator host program on a simulator to allow performance measurements to be taken.

42. The computer program product of claim 41, the process further comprising linking an already-annotated module with the software simulation model.

43. A computer implemented method of translating an assembly language software module into an assembler-level software simulation model, comprising:
receiving the assembly language software module;
parsing the assembly language software module into a data structure, the data structure comprising one or more nodes, each of the one or more nodes being mapped to a period of time using a mapping definition, each of the one or more nodes containing an element of the assembly language software module;
processing, by using a processor, the data structure to refine accuracy of an assembler-level software simulation model by generating the assembler-level software simulation model based on the assembly language software module by using the assembly language software module, wherein the assembler-level software simulation model is expressed in a high-level programming language and is used to determine a time slot;
associating performance information comprising a predicted execution delay with an element of the assembly language software module to capture a dynamic interaction between tasks during runtime, wherein the act of associating is performed during a time of the act of parsing the assembly language module software module into a data structure; and
displaying a result of the assembler-level software simulation model on a display apparatus or storing the result of the assembler-level software simulation model in a computer usable storage medium.

44. The method of claim 43, wherein the one or more nodes comprise a first node and a second node, the first node being mapped to a first period of time, the second node being mapped to a second period of time, the first period of time being different from the second period of time.

45. The method of claim 43, wherein the performance information comprises an execution delay value for the element of the assembly language software module.

46. The method of claim 43, wherein the performance information is a statically computed value.

47. The method of claim 43, wherein the performance information is a formula for dynamically computing a value.

48. The method of claim 43, wherein processing the data structure comprises replicating the behavior of the assembly language software model in the assembler-level software simulation model.

49. A system for performing performance analysis for a target machine which comprises a software portion and a hardware portion, comprising:
means for describing a design for the target machine as a network of logical entities;
means for selecting at least one of the logical entities for a software implementation;
means for implementing a source software program for the logical entities selected for the software implementation;
means for generating an optimized assembler code for the software program, wherein the optimized assembler code is an assembly-language representation of the software implementation;
a processor configured for performing a performance analysis using the optimized assembler code;
means for generating a software simulation model in a high level language format based at least in part upon the optimized assembler code by annotating the software simulation model with information related to hardware on which the software implementation runs based at least in part upon an execution result generated by the processor configured for performing the performance analysis to capture a dynamic interaction between tasks during runtime, wherein annotating the software simulation model is invoked during a time when the means for generating the software simulation model executes;
a computer usable storage medium configured for storing the software simulation model;
means for generating a hardware and software co-simulation model using the software simulation model; and
a second computer usable storage medium or the computer usable storage medium configured for storing at least the hardware and software co-simulation model or a display apparatus configured for displaying the at least the hardware and software co-simulation model.

50. A system of preparing software for a performance estimation, comprising:

means for obtaining a software assembly code module from a source code module, wherein the software assembly code module is an assembly-language representation;

a processor configured for performing an act of generating a software simulation model in a high level language format, wherein the software assembly code module comprises a binary code;

means for annotating the software simulation model with performance information of hardware together with which the software simulation model runs to capture a dynamic interaction between tasks during runtime, wherein the means for annotating the software simulation model is invoked during a time when the act of generating the software simulation model executes; and a computer usable storage medium configured for storing at least the software simulation model on a computer usable storage medium or displaying the at least the software simulation model on a display apparatus, wherein the software simulation model is an assembler-level software simulation model, expressed in a high-level programming language.

51. A system of translating an assembly language software module into a simulation model, comprising:

means for receiving the assembly language software module;

means for parsing the assembly language software module into a data structure, the data structure comprising one or more nodes, each of the one or more nodes being mapped to a period of time using a mapping definition, each of the one or more nodes containing an element of the assembly language software module;

a processor configured for processing the data structure to refine accuracy of an assembler-level software simulation model by generating the assembler-level software simulation model based on the assembly language software module by using the assembly language software module, wherein the assembler-level software simulation model is expressed in a high-level programming language and is used to determine a time slot;

means for associating performance information comprising a predicted execution delay with an element of the assembly language software module to capture a dynamic interaction between tasks during runtime, wherein the means for associating is invoked during a time when the means for parsing the assembly language software executes; and a display apparatus configured for displaying a result generated by the processor configured for processing the data structure to refine the accuracy of the assembler-level software simulation model or a computer usable storage medium configured for storing the result.

52. A computer program product that includes a computer usable storage medium, the medium comprising a sequence of instructions which, when executed by a processor, causes said processor to execute a method for translating an assembly language software module into an assembler-level software simulation model, comprising:

receiving the assembly language software module;

parsing the assembly language software module into a data structure, the data structure comprising one or more nodes, each of the one or more nodes being mapped to a period of time using a mapping definition, each of the one or more nodes containing an element of the assembly language software module;

processing, by using a processor, the data structure to refine accuracy of an assembler-level software simulation model by generating the assembler-level software simulation model based on the assembly language software module by using the assembly language software module, wherein the assembler-level software simulation model is expressed in a high-level programming language and is used to determine a time slot;

associating performance information comprising a predicted execution delay with an element of the assembly language software module to capture a dynamic interaction between tasks during runtime, wherein the act of associating is performed during a time of the act of parsing the assembly language software into a data structure; and displaying a result of the act of processing the data structure to refine accuracy of the assembler-level software simulation model on a display apparatus or storing the result in a computer usable storage medium.

* * * * *